United States Patent
Dortch et al.

(10) Patent No.: US 9,390,604 B2
(45) Date of Patent: Jul. 12, 2016

(54) FIRE DETECTION SYSTEM

(71) Applicant: THERMAL IMAGING RADAR, LLC, Orem, UT (US)

(72) Inventors: Michael D. Dortch, Orem, UT (US); Larry J. Price, Orem, UT (US); Brian A. Wittman, Orem, UT (US); Shaun P. Greene, Orem, UT (US); Bryce Lembke, Orem, UT (US)

(73) Assignee: THERMAL IMAGING RADAR, LLC, Orem, UT (US)

( * ) Notice: Subject to any disclaimer, the term of this patent is extended or adjusted under 35 U.S.C. 154(b) by 0 days.

(21) Appl. No.: 14/652,009

(22) PCT Filed: Apr. 9, 2014

(86) PCT No.: PCT/US2014/033547
§ 371 (c)(1),
(2) Date: Jun. 12, 2015

(87) PCT Pub. No.: WO2014/169066
PCT Pub. Date: Oct. 16, 2014

(65) Prior Publication Data
US 2015/0332571 A1 Nov. 19, 2015

Related U.S. Application Data

(60) Provisional application No. 61/810,192, filed on Apr. 9, 2013, provisional application No. 61/864,196, filed on Aug. 9, 2013.

(51) Int. Cl.
G08B 17/00 (2006.01)
G08B 29/18 (2006.01)
G08B 17/12 (2006.01)

(52) U.S. Cl.
CPC ............. *G08B 17/00* (2013.01); *G08B 17/005* (2013.01); *G08B 17/125* (2013.01); *G08B 29/185* (2013.01)

(58) Field of Classification Search
CPC ........ G08B 17/00; G08B 17/06; G08B 17/12; G08B 29/185; G08B 19/00; G08B 17/125; G08B 17/005; G08B 29/145; F02C 9/28; G01J 5/0066; G01J 5/0014; G01J 5/025; G01J 2005/0081; Y02T 50/672; G07C 5/0816; F05D 2260/80
USPC ......... 340/584, 577, 540, 546, 587, 588, 506, 340/511, 628; 348/143, 207.99, 159; 382/100, 203; 250/339.15, 347, 339.01
See application file for complete search history.

(56) References Cited

U.S. PATENT DOCUMENTS 3,336,810 A  8/1967  Schaffer et al.
3,648,384 A  3/1972  Roberts
(Continued)

FOREIGN PATENT DOCUMENTS

WO  2013/109742  7/2013
WO  2013/109976  7/2013
(Continued)

OTHER PUBLICATIONS

U.S. Appl. No. 14/652,006, filed Jun. 12, 2015, Dortch, et al.
(Continued)

*Primary Examiner* — Anh V La
(74) *Attorney, Agent, or Firm* — Workman Nydegger

(57) ABSTRACT

Detecting an extreme temperature event. A method includes collecting raw data from a high resolution sensor. The method further includes identifying in the raw collected data one or more changing data point values. The method further includes identifying, in the raw collected data that the one or more changing data point values have reached a determined threshold that indicates with a high level of probability that an extreme temperature event has occurred. Alternatively, the method may include identifying in the raw collected data a sudden extreme increase in one or more data point values that cross a threshold which indicates with a high level of probability that an extreme temperature event has occurred. As a result, the method includes issuing an alert indicating that an extreme temperature event has occurred.

18 Claims, 4 Drawing Sheets

(56) References Cited

U.S. PATENT DOCUMENTS

| | | | |
|---|---|---|---|
| 3,769,501 | A | 10/1973 | McDonough |
| 4,263,513 | A | 4/1981 | Palluet |
| 4,602,857 | A | 7/1986 | Woltz et al. |
| 4,922,275 | A | 5/1990 | Hughes |
| 4,982,218 | A | 1/1991 | Tsuboi et al. |
| 5,752,113 | A | 5/1998 | Borden |
| 5,790,183 | A | 8/1998 | Kerbyson |
| 6,738,073 | B2 | 5/2004 | Park et al. |
| 6,948,402 | B1 | 9/2005 | Amendolea |
| 6,991,384 | B1 | 1/2006 | Davis |
| 6,992,722 | B2 | 1/2006 | Jung |
| 7,324,135 | B2 | 1/2008 | Ouchi et al. |
| 7,381,952 | B2 | 6/2008 | Teich et al. |
| 7,423,272 | B2 | 9/2008 | Hasegawa et al. |
| 7,436,438 | B2 | 10/2008 | Sim et al. |
| 7,732,771 | B2 | 6/2010 | Hasegawa et al. |
| 7,991,575 | B2 | 8/2011 | Vogel et al. |
| 8,106,936 | B2 | 1/2012 | Strzempko et al. |
| 8,194,912 | B2 | 6/2012 | Kitaura et al. |
| 8,285,512 | B2 | 10/2012 | Vogel et al. |
| 8,355,042 | B2 | 1/2013 | Lablans |
| 8,773,503 | B2 | 7/2014 | Dortch et al. |
| 2001/0026684 | A1 | 10/2001 | Sorek et al. |
| 2001/0027456 | A1 | 10/2001 | Lancaster et al. |
| 2002/0025023 | A1 | 2/2002 | Herold et al. |
| 2003/0025599 | A1 | 2/2003 | Monroe |
| 2003/0174056 | A1* | 9/2003 | Harshaw ............... G08B 17/00 340/522 |
| 2004/0075741 | A1 | 4/2004 | Berkey et al. |
| 2004/0183941 | A1 | 9/2004 | McCutchen |
| 2005/0261820 | A1* | 11/2005 | Feeney ................. F01D 19/00 701/100 |
| 2008/0106593 | A1 | 5/2008 | Arfvidsson et al. |
| 2009/0051310 | A1 | 2/2009 | Chandhoke |
| 2010/0091089 | A1 | 4/2010 | Cromwell et al. |
| 2010/0097444 | A1 | 4/2010 | Lablans |
| 2010/0142757 | A1 | 6/2010 | Sandstrom et al. |
| 2011/0220797 | A1 | 9/2011 | Hoelter et al. |
| 2011/0316970 | A1 | 12/2011 | Cheong |
| 2012/0127169 | A1 | 5/2012 | Barcay et al. |
| 2012/0133639 | A1 | 5/2012 | Kopf et al. |
| 2012/0194564 | A1 | 8/2012 | White et al. |
| 2012/0293334 | A1* | 11/2012 | Yu ......................... G08B 17/10 340/632 |
| 2012/0299920 | A1 | 11/2012 | Coombe et al. |
| 2012/0300019 | A1 | 11/2012 | Yang et al. |
| 2012/0314066 | A1 | 12/2012 | Lee et al. |
| 2012/0320148 | A1 | 12/2012 | Unger |
| 2013/0002807 | A1 | 1/2013 | Vogel et al. |
| 2013/0030699 | A1 | 1/2013 | Barnes et al. |
| 2013/0048855 | A1 | 2/2013 | Abreo |
| 2013/0079955 | A1 | 3/2013 | Masiello et al. |
| 2013/0103303 | A1 | 4/2013 | Lynch |
| 2013/0113827 | A1 | 5/2013 | Forutanpour et al. |
| 2013/0176130 | A1* | 7/2013 | Hoesl ................. F24F 11/0086 340/588 |
| 2013/0188010 | A1 | 7/2013 | Dortch et al. |
| 2014/0192184 | A1* | 7/2014 | Wu ..................... G08B 17/005 348/135 |

FOREIGN PATENT DOCUMENTS

| | | |
|---|---|---|
| WO | 2014/169061 | 10/2014 |
| WO | 2014/169066 | 10/2014 |
| WO | 2015/021186 | 2/2015 |

OTHER PUBLICATIONS

U.S. Appl. No. 14/738,391, filed Jun. 12, 2015, Dortch, et al.
U.S. Appl. No. 14/456,329, filed Aug. 11, 2014, Dortch.
U.S. Appl. No. 29/523,032, filed Apr. 6, 2015, Dortch, et al.
Chu, Elbert. "Invention Awards 2014:360-Degree Infrared Vision." Popular Science. May 5, 2014. Web. Accessed Feb. 27, 2015.
U.S. Appl. No. 13/745,514, Jan. 10, 2014, Office Action.
U.S. Appl. No. 13/745,514, Apr. 11, 2014, Notice of Allowance.
U.S. Appl. No. 14/456,329, May 14, 2015, Restriction Requirement.

* cited by examiner

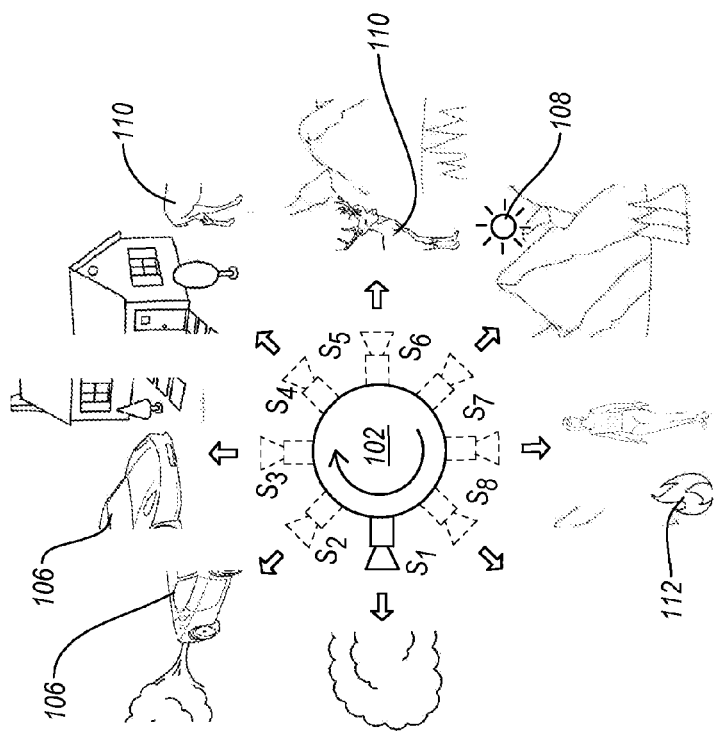
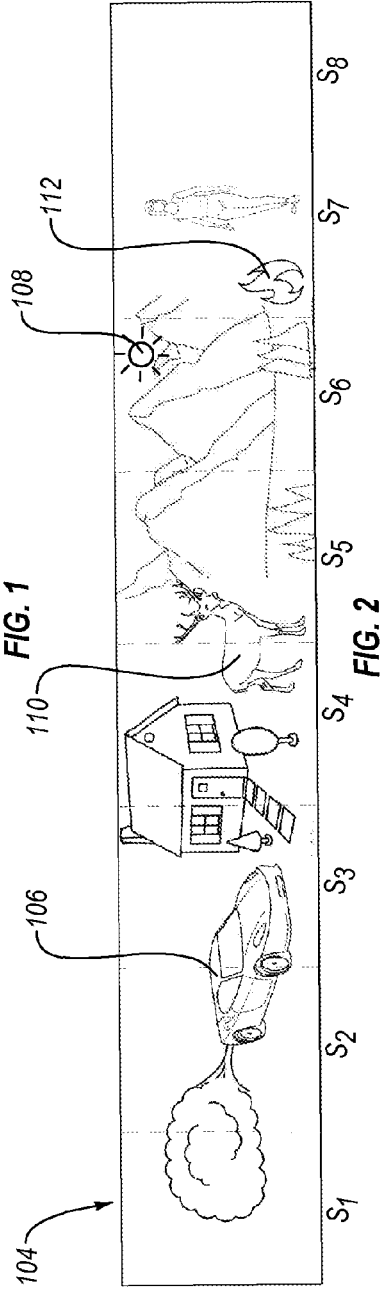
FIG. 1
FIG. 2

FIRE DETECTION SYSTEM

CROSS-REFERENCE TO RELATED APPLICATIONS

This application claims the benefit of Patent Cooperation Treaty Application Number PCT/US2014/033547, filed Apr. 9, 2014, titled "FIRE DETECTION SYSTEM" which claims priority to U.S. Provisional Application No. 61/810,192 filed Apr. 9, 2013, titled "STEPPER MOTOR CONTROL AND FIRE DETECTION SYSTEM", and U.S. Provisional application No. 61/864,196 filed Aug. 9, 2013 titled "METHODS FOR ANALYZING THERMAL IMAGE DATA USING A PLURALITY OF VIRTUAL DEVICES, CORRELATING DEPTH VALUES TO IMAGE PIXELS, AND A SYSTEM INCLUDING A SEAMLESS LENS COVER", each of which is incorporated herein by reference in its entirety.

BACKGROUND

Thermal imaging uses cameras that can detect heat and produce images based on an amount of heat. Additionally, the images can be used to qualitatively determine temperatures and temperature differences. For example, a black and white thermal image will display hotter objects with brighter whites as compared to darker grays for cooler objects. A color thermal image may use a rainbow of colors to show temperature, where hotter objects are shown in colors closer to or at the red end of the spectrum and cooler objects are shown in colors closer to or at the violet end of the spectrum.

Thermal imaging data from high resolution sensors is often processed using automatic gain control to convert the high resolution data down to 8 bit data. The conversion often results in temperature data being modified such that resolution is lost. For example, in a post processed image, it may be difficult to distinguish between wildlife and wildfires as they will both appear on the 8 bit, post processed gray scale image having the same or similar gray tone.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method of detecting an extreme temperature event. The method includes collecting raw data from a high resolution sensor. The method further includes identifying in the raw collected data one or more changing data point values by comparing it to the established background model. This background model is established by averaging pixel values over one or more frames to determine a value range for each pixel in the background. The method further includes identifying, in the raw collected data that the one or more changing data point values have reached a determined threshold that indicates with a high level of probability that an extreme temperature event has occurred. As a result, the method includes issuing an alert indicating that an extreme temperature event has occurred.

In another embodiment, another method of detecting an extreme temperature event is illustrated. The method includes collecting raw data from a high resolution sensor. The method further includes identifying in the raw collected data a sudden extreme increase in one or more data point values that cross a threshold which indicates with a high level of probability that an extreme temperature event has occurred. As a result, the method further includes issuing an alert indicating that an extreme temperature even has occurred.

In yet another embodiment, a system for detecting extreme temperature events is disclosed. The system includes a high resolution thermal imaging sensor configured to detect heat. The system further includes one or more processors coupled to the high resolution sensor. The processor is configured to collect raw data from the high resolution sensor. The processor is further configured to identify in the raw collected data a sudden extreme increase in one or more data point values that cross a threshold which indicates with a high level of probability that an extreme temperature event has occurred. The processor is further configured to issue an alert indicating that an extreme temperature even has occurred.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 1 illustrates a thermal imaging camera in an environment where thermal events are to be detected;

FIG. 2 illustrates thermal images obtained by the thermal imaging camera;

DETAILED DESCRIPTION

Figure 3:
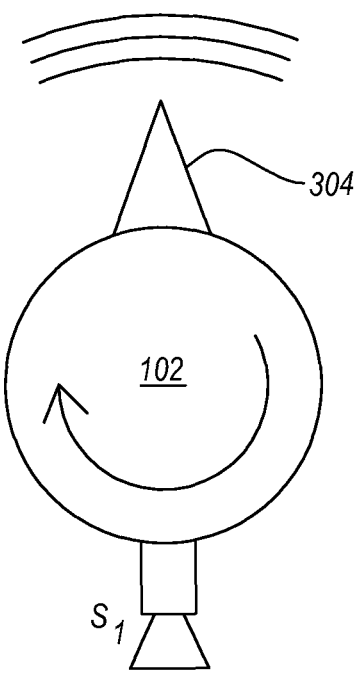
FIG. 3 illustrates communication between a thermal imaging camera and an event dispatcher.
Figure 3:
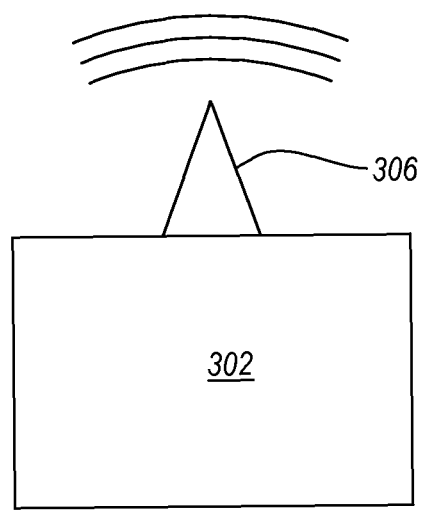

Grayscale Thermal images are typically processed using automatic gain control (AGC) to create a visually pleasing image using 256 grey scale shades, as that is about the number of shades perceptible by the human eye. However, this often results in an inability to distinguish very different events. In particular, when such processing has occurred, one cannot tell from the post processed image the difference between a wildlife animal emitting body heat and a wildfire emitting inferno heat based only on the grey scale shade, as they both have the same gray scale shade. The AGC algorithm tries to maximize the visibility of all objects in the images without regards to their actual temperature. The AGC algorithm does this by using different conversion factors for different regions in the image so that each region of the image has maximum contrast between objects and the background.

Some embodiments herein can overcome this by using automatic detection of extreme temperature events, such as a fire, by using machine processing of raw image data, prior to (or in lieu of) post processing to create a visually pleasing image, to determine the probability that an extreme temperature event has occurred. For example, using a 14 bit camera, each pixel has a possibility of 16,384 different values. A raging fire might have a value in the 16,000 range, while a wild animal might have a value in the 7,000 range. While 8 bit post processing will sufficiently obfuscate this difference such that one would not be able to detect the difference between a wild animal or a raging fire, by using the pre-processed 14 bit (or other high resolution) image data, a system can continue to detect the difference between the two.

However, there may nonetheless be normal, non-harmful events that, even using the 14 bit high resolution data may be virtually or nearly indistinguishable, based on grayscale imaging ranges from a wildfire. For example, an automobile engine exhaust may appear in a similar range as a wildfire. Similarly, the sun coming over a ridge may appear nearly identical to a wildfire coming over a ridge. Indeed, even a wild animal relatively close to a camera may have a thermal signature similar to that of a wildfire at a relatively long distance from the camera. Thus, embodiments may include various filters for distinguishing such events.

Detecting an extreme temperature event may be done in a number of different ways. For example, in some embodiments, scans may be made, such as by using the camera configuration illustrated in FIG. 1. In particular, FIG. 1 illustrates a camera 102. The camera 102 is configured to stop at 8 different stations (shown at $S_1$ through $S_8$) to take still images at each of those stations. This can be used to create individual images which can be used individually or can be used to create a panoramic image, such as the panoramic image 104 illustrated in FIG. 2. However, typically the panoramic image will not be used as assembling and storing a panoramic image can be computationally expensive. In this case, the individual images can be used. Thus, the examples below can be applied to panoramic images or sets of individual images.

In the illustrated example, at station $S_1$ and $S_2$, the camera 102 is able to detect the exhaust from a car 106. At station $S_6$, the camera 102 is able to detect the sun 108 rising over mountains. At station $S_7$, the camera 102 is able to detect a fire 112. At stations $S_4$ and $S_5$, the camera 102 is able to detect an animal 110.

Using this configuration, a thermal image with one or more pixels having high values that are characteristic of an extreme temperature event may be used to identify an extreme temperature event. For example, in some embodiments, the camera 102 may continuously scan an area. If a portion of an area suddenly exhibits an extreme temperature change by a large change in raw data from a thermal camera 102, this may be an indication of an extreme temperature event such as a fire. For example, a fire may travel over a mountain top or other barrier which would be detected as a sudden and extreme temperature change. Embodiments could use this sudden change indicated in the raw data of a thermal camera to cause an alert to be automatically generated and sent, such as using a cellular modem, satellite modem, or other communication means.

In other embodiments, locations may be continuously monitored using a high resolution thermal camera 102. The raw data (e.g. not processed using external automatic gain control) from such a camera may indicate an increasing temperature at a location. This increasing temperature can often be identified, based on characteristics regarding how it increases, as an extreme temperature event, such as a forest fire. This information can then be used to provide an indication, as described earlier, alerting appropriate individuals and/or systems regarding the extreme temperature event.

Illustrating now additional detail, embodiments use several images at each station (e.g. stations $S_1$-$S_8$). In some embodiments, three to ten images are obtained at each station and used to create a background model. During this process the digital signal processing is used to determine an acceptable range of values for each pixel in the raw format. This background model establishes the basis for making a determination that a pixel or several pixels have risen in value sufficiently so as to create an event or crossed a predetermined temperature threshold.

Each event is then filtered using various filters to determine that it is in fact a fire. Some of the criteria used in this filtering involves eliminating other possible sources of the hot spots (sun rise, engine exhaust, etc.) and others involving determining the exact temperature of the event itself.

For example, some embodiments may include a model that indicates sun position in the sky. If a sudden increase in temperature matches the location of the sun as predicted by the model, the temperature increase can be eliminated as a wildfire.

Alternatively or additionally, embodiments may be able to determine the distance from the camera of a heat source. Using the distance, a determination can be made if the heat source is sufficiently hot to be a wildfire. Thus, for example, an animal at a close distance may have a similar heat signature as a wildfire at a different distance, but due to the differences in distance, the two heat events can be distinguished.

In yet another alternative embodiment, the movement characteristics of a wildfire may be generally modeled. If a measured temperature event has sufficient heat detected, but does not meet an appropriate movement profile, it can be determined that the event does not represent a wildfire. For example, if exhaust from a vehicle is detected, and the movement of the exhaust is according to a profile for a vehicle, or at least does not meet the movement profile of a wildfire, then the exhaust will not be reported as a wildfire.

Thus, embodiments may perform an evaluation that involves taking into account the value of the pixel(s) and the distance from the camera they are (e.g. to allow for atmospheric adsorption). The distance from the camera 102 is discussed below as z-depth. Once embodiments have determined temperature and eliminated other possible sources, it is possible to make the determination, with a very high level of certainty, that the event is indeed a fire. In some embodiments, the appropriate computations are done on an onboard processing system inside the camera 102.

Determining z-depth can be done in one embodiment by identifying the camera's GPS location, topographical data for the location of the camera and surrounding area (e.g. from the US Geological Survey (USGS), or other data source), and developing a 3D model of the surrounding terrain. Embodiments can then use the height and angle of the camera and this 3D model to generate a depth map for each camera station which assigns a z-depth to each pixel in the image viewport for that station. The bottom pixel of event bounding boxes are compared to the corresponding pixel in the depth map to determine the distance of the event from the camera. This distance value is used by the system display to show relative position of an event (e.g. a wildfire or other event) to the camera. The event can be sent to an alert dispatcher 302 (see FIG. 3) to identify the location of the event and used by object classification filters to estimate the size of the event object. Given the size and aspect ratio, embodiments can filter out events that are not likely candidates for animals, people, vehicles, or otherwise uninteresting to a given scenario.

In some implementations a position of the camera 102 at which an image is captured can be correlated with actual geographical location data (e.g., GPS data). Once it is known where the actual camera 102 is based on geographical location data, the camera can be located on a 3D topography map, and depth values for individual pixels of a given frame of a station can be determined. Corrections may be made for tilt and height.

Correlating geographical location data with a position of camera 102 can include, but is not limited to, correlating pixel positions of a captured image and determining depth values for pixel positions of individual thermal imaging camera images based on the geographical location of thermal imaging camera 102. Given the elevation and orientation of thermal imaging camera 102, the distance or depth value for each pixel of an image may be calculated using elevation data, for example, from the National Elevation Dataset.

The depth value calculation to be associated with a given pixel can be done in a series of steps for determining (e.g., calculating) how each pixel represents a ray projected from the camera across the landscape intersecting the ground. Generally, this may be achieved by using a projected camera view on a wireframe terrain model created using elevation data (e.g., from the National Elevation Dataset) to estimate where each rendered pixel of the camera view would intersect the wireframe to calculate the probable "z" depth value of the bottom of each image element or pixel. Such a process may employ a loop process carried out through increasing z-distances until the projected height intersects the elevation height at a distance.

This may be done by determining (e.g., calculating) if a ray having a length equal to the camera's height intersects the ground at the projected distance. This determination may be repeated by repeatedly increasing the ray length by a given amount (e.g., 1 decimeter) until the ground is reached (e.g., intersected) or the ray exceeds a given length (e.g., 30 kilometers). Such an excessive length may be used to help render the horizon. Data for latitude, longitude, elevation and distance of the intersection point may be stored, and the determination (e.g., calculation) may be repeated for the next pixel of a column. Once a column of pixels reaches the horizon, the determination may move onto a new column. Such determinations or calculations may be based off variable Vertical Field of View, Horizontal Field of View, elevation and orientation. The final data set may be used to render an image that depicts distance (e.g., in gray scale) with lines placed at a given distance (e.g., every 100 meters). The determined or calculated image may be compared against an actual image for a final adjustment of the input variables. Once completed, the final result would provide a "z" depth value map that can be saved for future immediate analytics availability.

Illustrative of the steps described above, an image of 640× 512 may require repetition of the described determinations approximately 250000 times.

Once depth values for pixel positions are determined, this may allow determination of the size or movement speed of an object captured within an image. Processing that correlates pixel positions of an image with location data and determination of a depth value associated with each pixel may be performed off-site at a remote user interface terminal. The actual depth values associated with given pixels of the images may be relayed to the camera system for storage and use on-site.

Background modeling is discussed above. Once an object is determined to be a change from a background image, filters are applied to classify the object in question. In this context, object means the rectangular area in the image that is determined to be changed from the background image using the algorithm discussed below.

One filter looks at the quantity of objects detected in a given frame and compares it to the previous frames for the station. A sudden large quantity of changes, (large being determined by the configuration of the analytics) indicate a dramatic change in the environment or movement in the camera position. In this event some embodiments are configured to wait for an additional frame to determine whether this was a temporary event associated with camera movement, or a change in the environment. If the change persists then this can trigger building a new background model.

Another filter compares the object to the original background looking for an offset where the image would match the original background. This helps filter out movement of the camera itself, or movement of a background object associated with wind or similar events.

Another filter looks for other detected objects in the vicinity of the object in question to determine whether these could be parts of the original object in an attempt to coalesce multiple objects into a single object to improve classification. This may be used for intrusions captured in an image where portions of the intrusion are close to ambient temperature and therefore were not detected in the background modeling as objects.

Another filter uses the z-depth to estimate the size of the object and the aspect ratio to determine whether the object is taller than wide or visa-versa and by how much. This sets up candidates for classification as a person or a vehicle, etc. The estimated distance and aspect ratio are used to determine the initial confidence in the classification.

Another filter looks at the intensity and distribution of the pixel values in the object compared to ambient to determine whether the object matches expected criteria to classify as a human, animal or vehicle or is an unnatural event like a fire. This is also used to determine final confidence level.

Once a determination is made that an unnatural event like a wildfire has been detected, data is then transmitted via an appropriate network, such as cellular data, satellite, Wi-Fi, hard wire, etc. to a predetermined point. For example, FIG. 3 illustrates transmission of data from the camera 102 through a wireless transmitter 304 to a wireless receiver 306. This data may include, for example, location, size of the event, temperature, etc. Continuous monitoring of the event can provide additional data such as changes in size and speed. These high confidence alerts can be of sufficient certainty to dispatch aircraft or other response units very early to the fire potentially saving time, money, property, etc. as compared to fighting a larger fire later.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
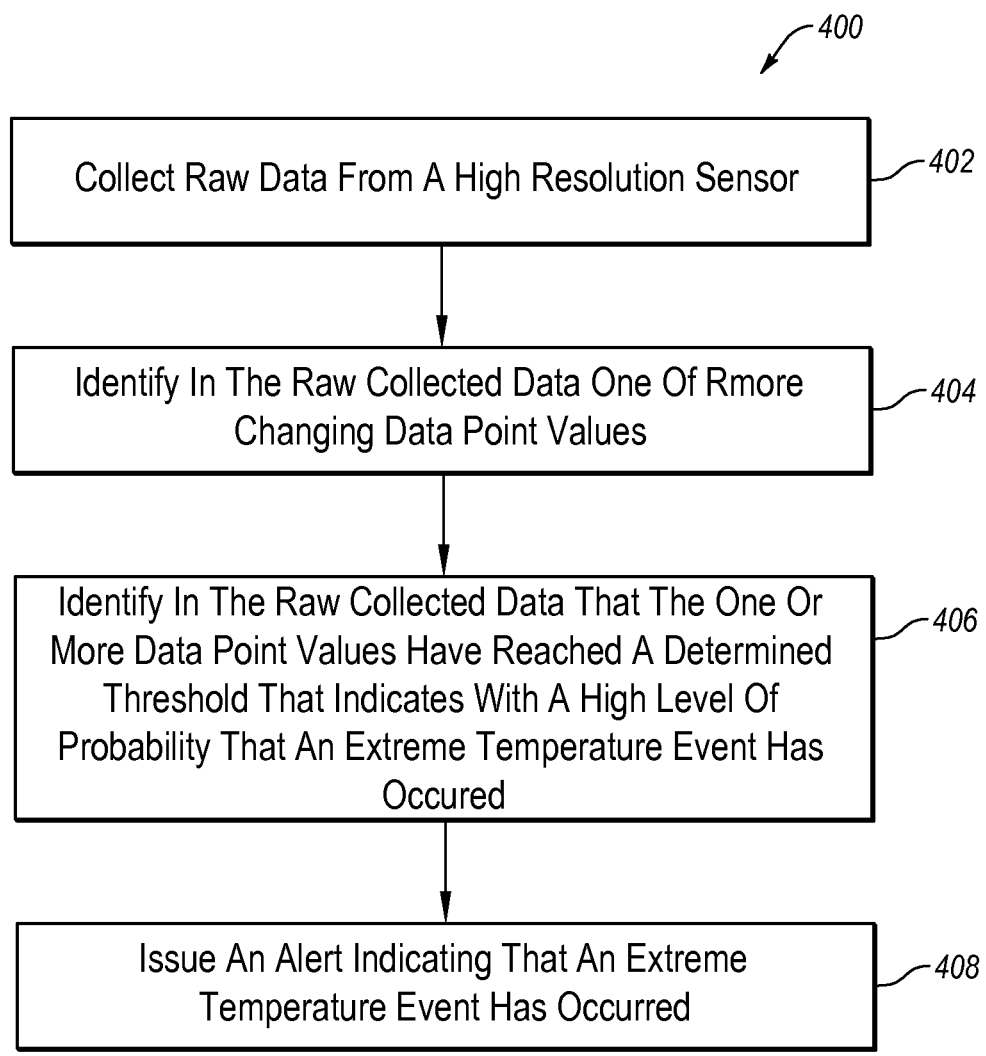
FIG. 4 illustrates a method for detecting extreme temperature events.

Referring now to FIG. 4, a method 400 is illustrated. The method includes acts for detecting an extreme temperature event. The method 400 includes collecting raw data from a high resolution sensor (act 402). For example, thermal image data may be collected from a thermal imaging camera 102. The sensor may have high resolution data, such as 14 bit data or other high resolution data. The data may be raw data such that it represents an absolute value detected by the sensor or at least maintains some raw correlation between heat detected and data point values.

The method 400 further includes identifying in the raw collected data one or more increasing data point values (act 404). This may be done by comparing data points to an established background model. This background model is established by averaging pixel values over one or more frames to determine a value range for each pixel in the background. For example, over time, a data point value may increase indicating more heat being given off over time. The data point value may be a relative data point value rather than an absolute data point value. In particular, the data point value may represent some geographical location which a different absolute data point value represents at a different time. This may occur, for example, if the sensor is changes position or the image captured on each successive iteration of image capturing is slightly different.

The method 400 further includes identifying, in the raw collected data that the one or more increasing data point values have reached a determined threshold value that indicates with a high level of probability that an extreme temperature event has occurred (act 406).

The method 400 further includes as a result, issuing an alert indicating that an extreme temperature event has occurred (act 408). For example as illustrated in FIG. 3, an alert can be sent from a camera 102 to an alert dispatcher 302.

The method 400 may be practiced where the extreme temperature event is a fire.

As suggested above, the method 400 may be practiced where the alert is transmitted over a network. For example, the alert may be transmitted of a cellular network, satellite network, Wi-Fi network, wired network, or other appropriate network.

The method 400 may further include filtering other events to distinguish an extreme temperature event from the other events. For example, the method may include filtering out automobiles, the sun, animals, people, manual overrides, or other events to distinguish these events form an extreme temperature event of interest. For example, filters may include information on weather patterns, sunrise and sunset, barometric pressure, geographical information, structure information (such as identifying fire pits or other heat generating objects), manually identified information (for example, a user may indicate the date, time and place that a controlled burn is to be executed), etc. Filtering may include comparing an image generated by the high resolution sensor with a background image previously generated by the high resolution sensor. In some such embodiments, the method 400 may further include determining that a change in a certain number of images for a given station has persisted for a sufficient number of images for the given station. As a result, the method may include updating the background image.

The method 400 may include determining distances of items detected by the high resolution sensor. For example, this may be accomplished by consulting a 3D model constructed from GPS data identifying the location of the high resolution sensor and US Geological Survey data defining terrain surrounding the high resolution sensor. The method may include, using the model along with information about the height and angle of the high resolution sensor to determine distances of items from the sensor.

Figure 5:
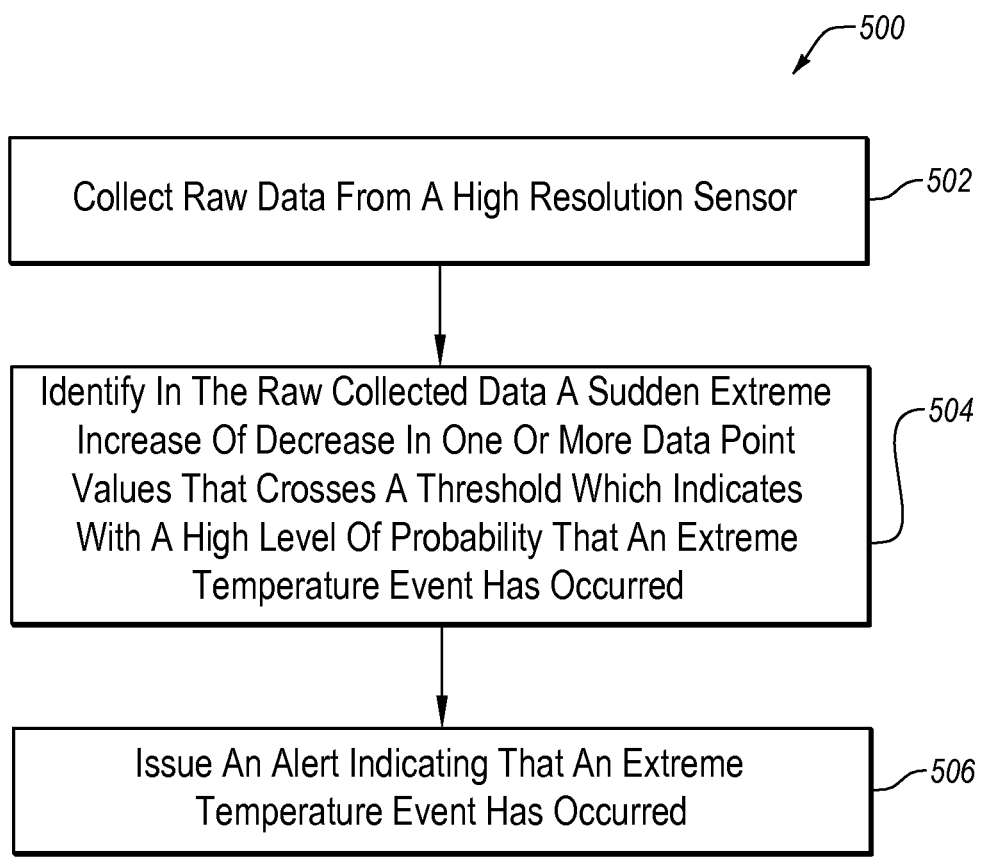
FIG. 5 illustrates another example of a method for detecting extreme temperature events.

Referring now to FIG. 5, a method 500 is illustrated. The method 500 includes acts for detecting an extreme temperature event. The method includes collecting raw data from a high resolution sensor (act 502).

The method 500 further includes identifying in the raw collected data a sudden extreme increase in one or more data point values that cross a threshold which indicates with a high level of probability that an extreme temperature event has occurred (act 506).

As a result, the method 500 further includes issuing an alert indicating that an extreme temperature even has occurred (act 508).

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of detecting a temperature event that exceeds a temperature threshold, the method comprising:
    collecting raw thermal data from a high resolution thermal-image sensor;
    identifying in the collected raw thermal data a change in one or more thermal values by comparing the one or more changing thermal values to an established thermal background model;
    identifying one or more events associated with the one or more changing thermal values;
    determining a distance from the high resolution thermal-image sensor to the one or more identified events;
    based at least partially on the determined distance of the one or more identified events, identifying in the collected raw thermal data that the one or more changing thermal values have reached a determined threshold that indicates with a high level of probability that the one or more events comprise an extreme temperature event; and
    as a result, issuing an alert indicating that the extreme temperature event has occurred;
    wherein determining distances of the one or more identified events comprises consulting a 3D model constructed from GPS data identifying the location of the high resolution sensor and US Geological Survey data defining terrain surrounding the high resolution sensor and using the model along with information about the height and angle of the high resolution sensor to determine distances of events from the sensor.

2. The method of claim 1, wherein the extreme temperature event is a fire.

3. The method of claim 1, wherein the alert is transmitted over a network.

4. The method of claim 1, further comprising:
    identifying at least two events; and
    filtering the at least two events to distinguish extreme temperature from other events.

5. The method of claim 4, wherein filtering comprises comparing an image generated by the high resolution sensor with a background image previously generated by the high resolution sensor.

6. The method of claim 5, further comprising determining that a change in a certain number of images for a given station has persisted for a sufficient number of images for the given station, and as a result updating the background image.

7. The method of claim 4, wherein filtering includes using one or more different filters, the one or more filters including information corresponding to at least one of the following: weather patterns, sunrise, sunset, barometric pressure, planned controlled burning, geographical information, structure information, and user-identified information.

8. The method of claim 1, wherein the change in one or more thermal values comprises a sudden extreme increase.

9. The method of claim 4, wherein filtering comprises comparing the at least two events to a profile of movement characteristics of a wildfire to distinguish extreme temperature events from other events.

10. A computer system, comprising:
    one or more processors;
    a high resolution thermal imaging sensor configured to detect heat; and
    one or more computer readable storage media having stored thereon computer-executable instructions that are executable by the one or more processors to cause the computer system to detect an extreme temperature event, the computer-executable instructions including instructions that are executable to cause the computer system to perform at least the following:
    collect raw data from a high resolution sensor;
    identify in the raw collected data a change in one or more data point values by comparing the one or more data point values to an established background model;
    identify one or more events associated with the one or more changing data point values;
    determine a distance from the high resolution sensor to the one or more identified events;
    based at least partially on the determined distance of the one or more identified events, identify in the raw collected data that the one or more changing data point values have reached a determined threshold that indicates with a high level of probability that the one or more events comprise the extreme temperature event; and as a result, issue an alert indicating that the extreme temperature event has occurred;

wherein determining distances of the one or more identified events comprises consulting a 3D model constructed from GPS data identifying the location of the high resolution sensor and US Geological Survey data defining terrain surrounding the high resolution sensor and using the model along with information about the height and angle of the high resolution sensor to determine distances of events from the sensor.

11. The computer system of claim 10, wherein the extreme temperature event is fire.

12. The computer system of claim 10, wherein the alert is transmitted over a network.

13. The computer system of claim 10, wherein the one or more identified events are filtered to distinguish extreme temperature events from other events.

14. The computer system of claim 13, wherein filtering comprises comparing an image generated by the high resolution sensor with a background image previously generated by the high resolution sensor.

15. The computer system of claim 14, further wherein determining that a change in a certain number of images for a given station has persisted for a sufficient number of images for the given station, results in updating the background image.

16. The computer system of claim 10, wherein the change in one or more thermal values comprises a sudden extreme increase.

17. A computer program product comprising one or more hardware storage devices having stored thereon computer-executable instructions that are executable by one or more processors of a computer system to cause the computer system to detect an extreme temperature event, the computer-executable instructions including instructions that are executable to cause the computer system to perform at least the following:

collect raw data from a high resolution sensor;

identify in the raw collected data a change in one or more data point values by comparing the one or more data point values to an established background model;

identify one or more events associated with the one or more changing data point values;

determine a distance from the high resolution sensor to the one or more identified events;

based at least partially on the determined distance of the one or more identified events, identify in the raw collected data that the one or more changing data point values have reached a determined threshold that indicates with a high level of probability that the one or more events comprise the extreme temperature event; and as a result, issue an alert indicating that the extreme temperature event has occurred;

wherein determining distances of the one or more identified events comprises consulting a 3D model constructed from GPS data identifying the location of the high resolution sensor and US Geological Survey data defining terrain surrounding the high resolution sensor and using the model along with information about the height and angle of the high resolution sensor to determine distances of events from the sensor.

18. The computer program product of claim 17, wherein the one or more identified events are filtered to distinguish extreme temperature events from other events.

* * * * *